United States Patent [19]

Johnson

[11] 4,210,235

[45] Jul. 1, 1980

[54] BOAT SUPPORT ROLLER

[76] Inventor: Lawrence N. Johnson, 120 West High Dr., Spokane, Wash. 99203

[21] Appl. No.: 3,106

[22] Filed: Jan. 15, 1979

Related U.S. Application Data

[63] Continuation of Ser. No. 796,803, May 13, 1977, abandoned.

[51] Int. Cl.² .............................................. B60P 3/10
[52] U.S. Cl. ................................. 193/37; 193/35 C; 414/534
[58] Field of Search ............................. 193/35 C, 37; 280/414 R; 29/116 R; 301/67 PW; 308/16, 18, 20; 414/529, 534

[56] References Cited

U.S. PATENT DOCUMENTS

| | | | |
|---|---|---|---|
| 2,703,165 | 3/1955 | Couser | 193/37 |
| 3,608,236 | 9/1971 | Beny et al. | 301/1 |
| 3,888,367 | 6/1975 | Cox | 414/534 |
| 3,892,320 | 7/1975 | Moore | 414/534 |

*Primary Examiner*—Jeffrey V. Nase
*Attorney, Agent, or Firm*—August E. Roehrig, Jr.

[57] ABSTRACT

A roller structure adapted for supporting a boat on a trailer bed, or the like, which has a cushioned roller surface for engaging the boat hull to distribute the weight stress over a substantial area, and a mounting for the roller on the support bed to guide and support the boat as it is pulled across the rollers with minimum risk of damage to the hull.

8 Claims, 4 Drawing Figures

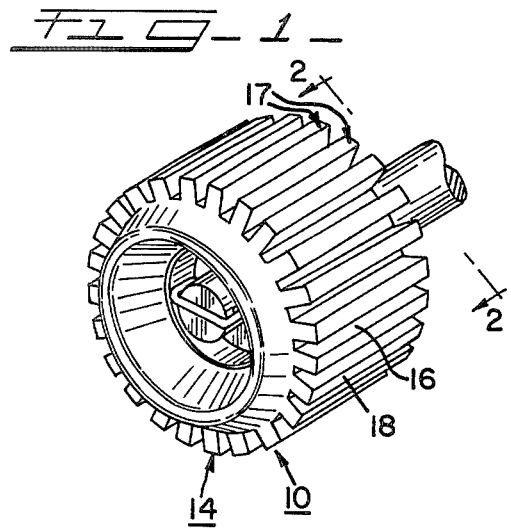
FIG-1-
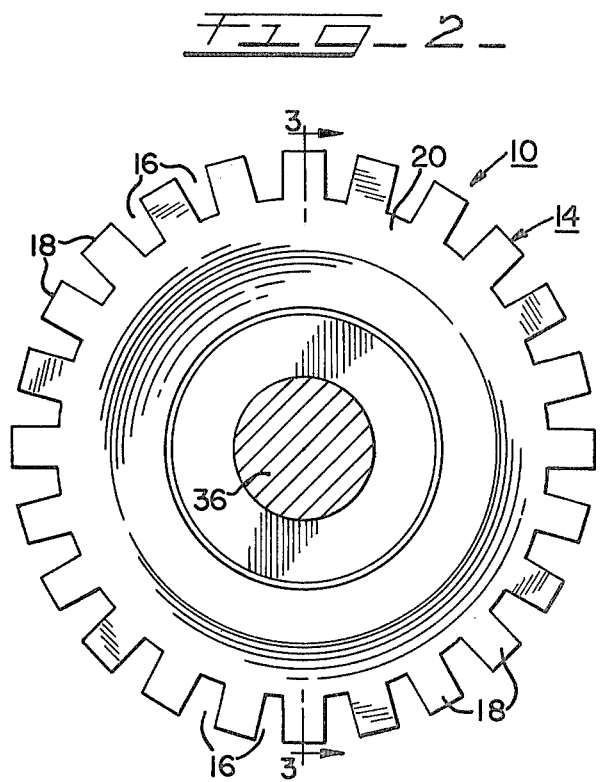
FIG-2-
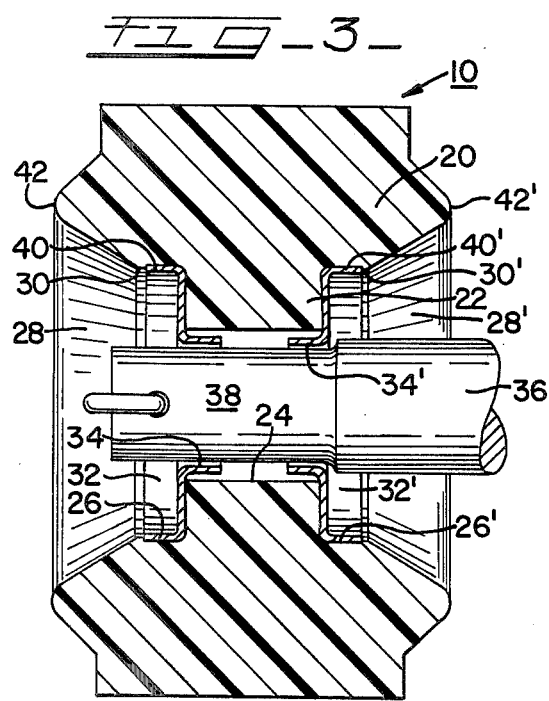
FIG-3-
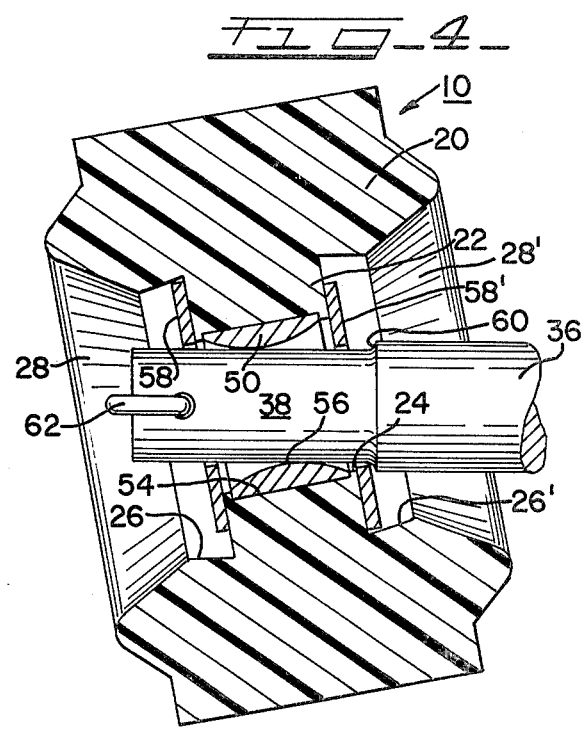
FIG-4-

BOAT SUPPORT ROLLER

This is a continuation of application Ser. No. 796,803, filed May 13, 1977, and now abandoned.

BACKGROUND OF THE INVENTION

This invention relates to boat carrying structures and is particularly concerned with improvements in supporting devices which are suitable for incorporation in a boat trailer or other boat transporting vehicle structure.

The adoption, by many, of boating as a hobby has resulted in the development of various accessories, such as, boat trailers, which are designed to make it more convenient to transport and store pleasure craft when not in the water. A well designed trailer must securely cradle a boat and also serve as a flexible launching device. It is highly desirable that the trailer have supporting elements or devices which will conform, at least in part, to the hull contour, so that contact pressures exerted will be distributed in a manner which will not cause localized stress sufficient to result in damage to the hull. Roller elements with rubber tread have been used with some degree of success for this purpose.

A general object of the invention is to provide a supporting device for incorporation in a boat trailer or the like which will adapt the structure constituting the trailer bed for the handling of boats of varying dimensions and hull contour with a greater degree of safety and in an easier manner than possible with similar structures previously developed.

A more specific object of the invention is to provide in a boat trailer or similar boat carrying structure an improved hull engaging roller construction which will adapt itself to the contour of the hull surface which it engages so as to distribute the resulting stress over a maximum contact area in a manner which will reduce to a minimum the likelihood of damage to the hull when loading or unloading or while the boat is resting thereon in storage.

Another object of the invention is to provide a boat supporting or contacting roller structure for boat trailers, or the like, wherein the roller surface provides an adequate cushion effect and with improved mounting, good guiding is obtainable.

Still another object of the invention is to provide a roller structure which includes interchangeable mounting elements enabling a gimbal effect to be achieved with either a conventional solid surface type roller or an improved cushion surface roller.

To this end the invention as claimed herein is embodied in a roller structure adapted for supporting a boat on a trailer bed, or the like, which has a roller surface adapted for engaging the boat hull so as to provide, at least to some degree, a cushion effect and which will distribute the stress over a substantial area and means for mounting the roller on the supporting bed so as to obtain good guiding and supporting as the boat is pulled across the rollers with minimum risk of damage to the hull.

The aforesaid objects and other objects and advantages of the invention will become more apparent when reference is made to the accompanying detailed description of the preferred embodiment of the invention which is set forth therein, by way of example, and shown in the accompanying drawings wherein like reference numerals indicate corresponding parts throughout.

BRIEF DESCRIPTION OF THE DRAWINGS

FIG. 1 is a perspective view of a supporting roller structure for a boat trailer which embodies the principal features of the invention;

FIG. 2 is an elevational view, to an enlarged scale, of the roller structure, the view being taken on the line 2—2 of FIG. 1;

FIG. 3 is a sectional view taken on the line 3—3 of FIG. 2; and

FIG. 4 is a sectional view, similar to FIG. 3, showing a modified mounting hub arrangement for obtaining a gimbal effect.

DESCRIPTION OF THE PREFERRED EMBODIMENTS OF THE INVENTION

The boat supporting bed or deck on a boat trailer is generally provided with an assembly of boat supporting pads or rollers which are mounted thereon in spaced relation so as to support the boat while it is mounted thereon and to facilitate loading and unloading the craft. The rollers will vary in number and placement on the trailer bed depending upon the size of the craft and the contour of the hull with which the rollers will engage.

In the form of the roller 10 which is illustrated in FIGS. 1 to 3, the roller body 12 is rubber or synthetic rubber of suitable hardness which is molded so as to provide a peripherial cushion section 14. The cushion section 14 is slotted, with the slots 16 extending in an axial direction, and being equally spaced about the peripherial surface so as to form between them axially extending, radially projecting rib formations 18 of substantial length. The slots 16 and the rib formations, in the form shown, are of generally rectangular cross section and of substantial cross sectional area. The ribs 18 are integrally formed with the main body section 20 of the roller which extends inwardly to a hub section or hub formation 22. The hub formation 22 has an axial bore 24 extending between pocket formations 26 and 26' which have a somewhat shallow depth in the direction of the roller axis and which are at the bottom or inner ends of outer recesses 28, 28' of substantially greater depth and of truncated cone shape. The inner recesses or pocket formations 26 and 26' face outwardly in opposite directions and have entrance edges 30, 30' which are of smaller diameter than the inner periphery of the pockets so as to frictionally retain therein bearing inserts 32, 32'. The bearing inserts 32, 32' are in the form of flanged washers, with inner flange formations 34, 34' which provide bearing surfaces for mounting the roller on a supporting shaft or pin 36, the latter having an end portion 38 of reduced diameter on which the inserts 32, 32' ride. The inserts 32, 32' have outer flange formations 40, 40' which are of larger outside diameter than the diameter of the entrance edges 30, 30' of the pockets so as to enable the inserts to be forced into the pockets 26, 26' and frictionally retained therein. The recess arrangement results in a protruding rib formation 42, 42' on each end face of the roller. The rib formation 42 on the outboard face extends outboard of the end 38 of the mounting shaft 36 and serves to prevent ready contact with the hard end surface of the shaft.

A modified mounting for the roller is shown in FIG. 4 which comprises an assembly of hub forming inserts which are interchangeable with the flanged inserts 32, 32' shown in FIG. 3. The roller body may be the same as roller 10 in FIGS. 1 to 3. In the mounting shown in FIG. 4, an internally cone shaped insert in the form of a bushing 50 is seated in the axial bore 52. The insert 50 may be of larger outside diameter than the cross sectional diameter of the bore 52 and be forced into seated relation in the bore so as to be frictionally retained therein or the bore may have a shallow recess, indicated at 54, to receive the insert 50. The inner face 56 of the insert 50 is inwardly bowed in the axial direction so as to provide a shaft contacting surface for obtaining a gimbal effect when mounted on the shaft end 38. Flat washers 58, 58' are positioned in the roll pockets 26, 26' in the opposite end faces of the roller body 12 which are of lesser outside diameter than the inside diameter of the pockets 26, 26' and which are retained against any substantial movement in an axial direction by the shoulder 60 on the shaft 36 and the locking staple member 62 in the end of the shaft section 38.

The cushion rib design of the roller enables the roller to more easily ride over or straddle the straights of the deep "V" designs of modern pleasure boat bottoms. It also spreads the weight out to cover more area of contacting surface and will not damage the sharp edges of the straights as they are pulled across the rolls during loading or launching. When the non-gimballing inserts are employed good guiding and a suitable cushion effect is obtained which is over and above the effect obtained with rollers heretofore employed.

The bearing forming inserts are interchangeable and provide good guiding and suitable cushion effect. The gimbal effect is achieved in a relatively simple manner by the inserts shown in FIG. 4. The washers act as keepers and keep the bushing centered while also acting as stops to limit gimballing to the extreme. The gimballing effect is highly desirable in handling boats of certain hull design, for example, those of a currently popular model which have a distinct concave shape on either side of the bow or keel line and extending out to the chine line.

I claim:

1. A roller structure for supporting a boat on a trailer or the like comprising
    shaft forming means for carrying a boat supporting roller for rotational movement relative thereto,
    a roller body carried by said shaft forming means in a position to engage the hull of a boat when the boat is moved into supportive contact thereupon,
    said roller body having a circumferential face extending in an axial direction relative to said shaft forming means and a hub formation with an axial bore for receiving shaft mounting means which has a substantial axial dimension with opposite ends spaced an axial distance less than the corresponding dimension of said circumferential face,
    said roller body having oppositely disposed end faces with a protruding rib formation projecting outboard of said end faces,
    said roller body being formed of a material having substantial resiliency with said circumferential face having a series of circumferentially spaced axially extending, radially projecting rib formations for engaging the surface of the boat,
    said hub formation having outwardly opening inner and outer recesses formed at opposite ends of said axial bore, said inner recesses having a diameter larger than the diameter of said axial bore and terminating at the inner most ends of said outer recesses which outer recesses extend with an outward and radial taper to said protruding rib formations on said oppositely disposed end faces with said protruding rib formations projecting outboard of said outer recesses,
    shaft mounting means including a bearing forming means disposed in part in said axial bore and in part in said outwardly opening inner recesses with shaft contacting portions disposed in said bore and between said inner recesses so as to mount said roller body onto said shaft forming means for rotational movement relative thereto, and
    said bearing forming means comprises flanged washer elements seated in said inner recesses with inturned flange formations extending into said bore for engaging said shaft forming means.

2. A roller structure for supporting a boat on a trailer or the like comprising
    shaft forming means for carrying a boat supporting roller for rotational movement relative thereto,
    a roller body carried by said shaft forming means in a position to engage the hull of a boat when the boat is moved into supportive contact thereupon,
    said roller body having a circumferential face extending in an axial direction relative to said shaft forming means and a hub formation with an axial bore for receiving shaft mounting means which has a substantial axial dimension with opposite ends spaced an axial distance less than the corresponding dimension of said circumferential face,
    said roller body having oppositely disposed end faces with a protruding rib formation projecting outboard of said end faces,
    said roller body being formed of a material having substantial resiliency with said circumferential face having a series of circumferentially spaced axially extending, radially projecting rib formations for engaging the surface of the boat,
    said hub formation having outwardly opening inner and outer recesses formed at opposite ends of said axial bore, said inner recesses having a diameter larger than the diameter of said axial bore and terminating at the inner most ends of said outer recesses which outer recesses extend with an outward and radial taper to said protruding rib formations on said oppositely disposed end faces with said protruding rib formations projecting outboard of said outer recesses,
    shaft mounting means including a bearing forming means disposed in part in said axial bore and in part in said outwardly opening inner recesses with shaft contacting portions disposed in said bore and between said inner recesses so as to mount said roller body onto said shaft forming means for rotational movement relative thereto, and
    said bearing forming means comprises double flanged washers with an outside diameter greater than the normal inside diameter of said inner recesses so as to be frictionally retained in said recesses when seated therein.

3. A roller structure for supporting a boat on a trailer or the like comprising
    shaft forming means for carrying a boat supporting roller for rotational movement relative thereto,
    a roller body carried by said shaft forming means in a position to engage the hull of a boat when the boat is moved into supportive contact thereupon, said roller body having a circumferential face extending in an axial direction relative to said shaft forming means and a hub formation with an axial bore for receiving shaft mounting means which has a substantial axial dimension with opposite ends spaced an axial distance less than the corresponding dimension of said circumferential face, said roller body having oppositely disposed end faces with a protruding rib formation projecting outboard of said end faces, said roller body being formed of a material having substantial resiliency with said circumferential face having a series of circumferentially spaced axially extending, radially projecting rib formations for engaging the surface of the boat, said hub formation having outwardly opening inner and outer recesses formed at opposite ends of said axial bore, said inner recesses having a diameter larger than the diameter of said axial bore and terminating at the inner most ends of said outer recesses which outer recesses extend with an outward and radial taper to said protruding rib formations on said oppositely disposed end faces with said protruding rib formations projecting outboard of said outer recesses, shaft mounting means including a bearing forming means disposed in part in said axial bore and in part in said outwardly opening inner recesses with shaft contacting portions disposed in said bore and between said inner recesses so as to mount said roller body onto said shaft forming means for rotational movement relative thereto, and said bearing forming means includes a bushing seated in said bore which has a radially inwardly curved inner surface to provide a gimbal effect when mounted on said shaft forming means.

4. A roller structure as set forth in claim 3 wherein said bearing forming means includes bushing retention washers disposed in said inner recesses for limiting the extent of the gimbal effect.

5. A roller structure as set forth in claims 1, 2, or 3 wherein said radially projecting rib formations on said circumferential face are spaced by axially extending radial slots of substantial width and depth and said radially projecting rib formations are of substantial dimensions in the circumferential direction so as to have outboard faces of substantial width for engaging the surface of the boat.

6. A roller structure for supporting a boat or a trailer or the like comprising shaft forming means for carrying a boat supporting roller for rotational movement relative thereto, a roller body carried by said shaft forming means in a position to engage the hull of a boat when the boat is moved into supportive contact thereupon, said roller body having a circumferential face extending in an axial direction relative to said shaft forming means and a hub formation with an axial bore for receiving shaft mounting means which has a substantial axial dimension with opposite ends spaced an axial distance less than the corresponding dimension of said circumferential face, said roller body being formed of a material having substantial resiliency, said hub formation having outwardly opening recesses formed at opposite ends of said axial bore, said recesses having a diameter larger than the diameter of said axial bore, shaft mounting means including bearing forming means disposed at least in part in said axial bore as to mount said roller body onto said shaft forming means for rotational thereto, said bearing forming means including a shaft contacting surface disposed in said bore to provide a gimbal effect permitting movement of the roller body relative to the shaft forming means, said shaft contacting surface having a configuration to create contact between said shaft forming means and said shaft contacting surface at a contacting portion thereof dependent on the relative position of the roller body to the shaft forming means, said contacting portion being variable in response to the roller body undergoing gimbal effect, the bearing forming means includes a bushing seated in said bore creating the shaft contacting surface, and said bushing having a radially inwardly curved inner surface to provide the gimbal effect.

7. The roller structure of claim 6 wherein the inwardly curved inner surface is curved to create a decreasing diameter of the bore axially inwardly from the opposite ends of the bore to substantially the midpoint thereof.

8. The roller of claim 6 wherein the shaft contacting surface circumferentially surrounds the shaft forming means.

* * * * *

UNITED STATES PATENT AND TRADEMARK OFFICE
CERTIFICATE OF CORRECTION

PATENT NO. : 4,210,235
DATED : July 1, 1980
INVENTOR(S) : Lawerence N. Johnson

It is certified that error appears in the above—identified patent and that said Letters Patent is hereby corrected as shown below:

First Page, Address of Inventor, "120" should be-- 130 --.

Column 2, line 6, "principal" should be -- principle --.

Signed and Sealed this

Sixteenth Day of September 1980

[SEAL]

Attest:

SIDNEY A. DIAMOND

*Attesting Officer*  *Commissioner of Patents and Trademark*